Patented Oct. 23, 1945

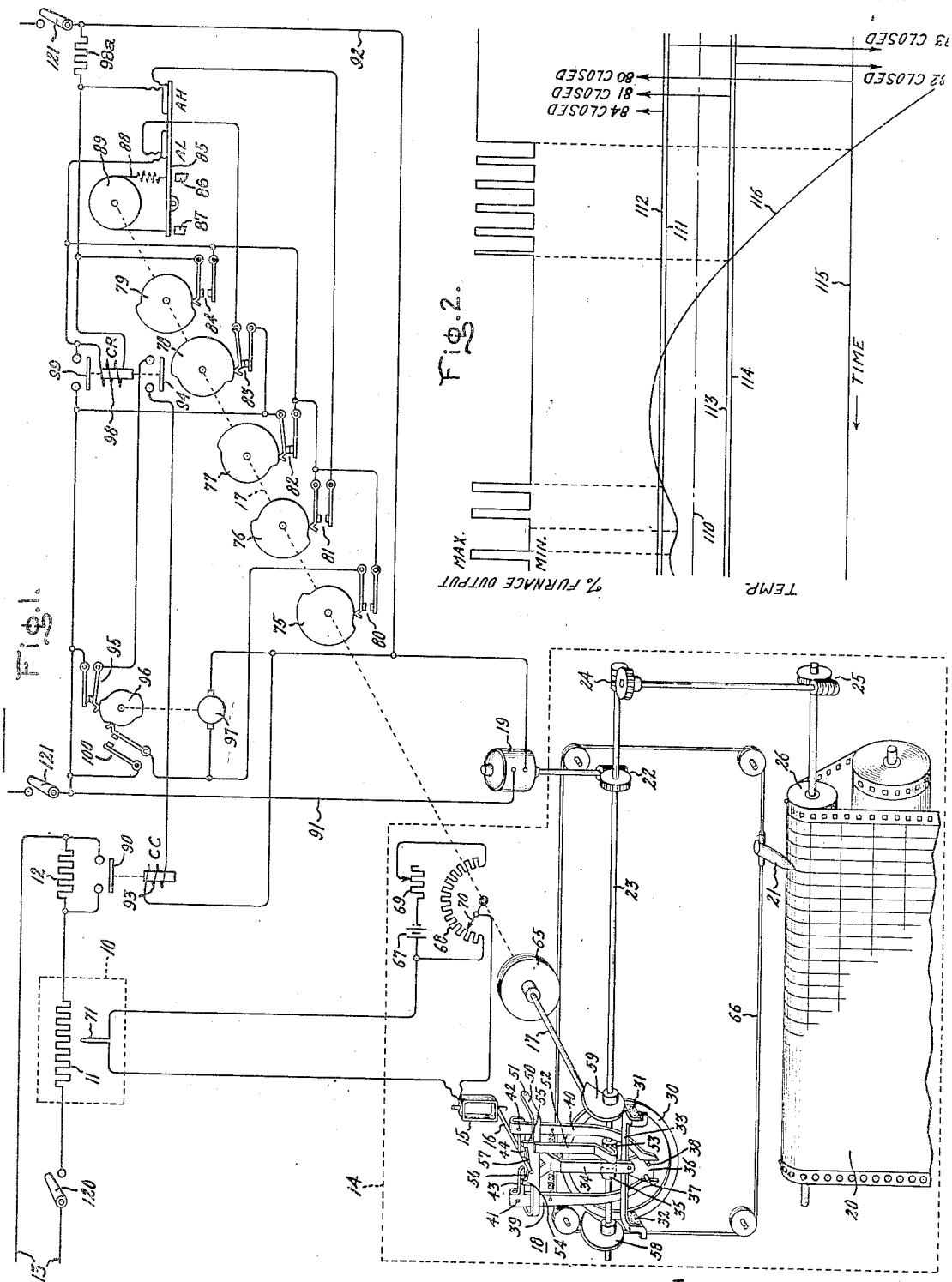

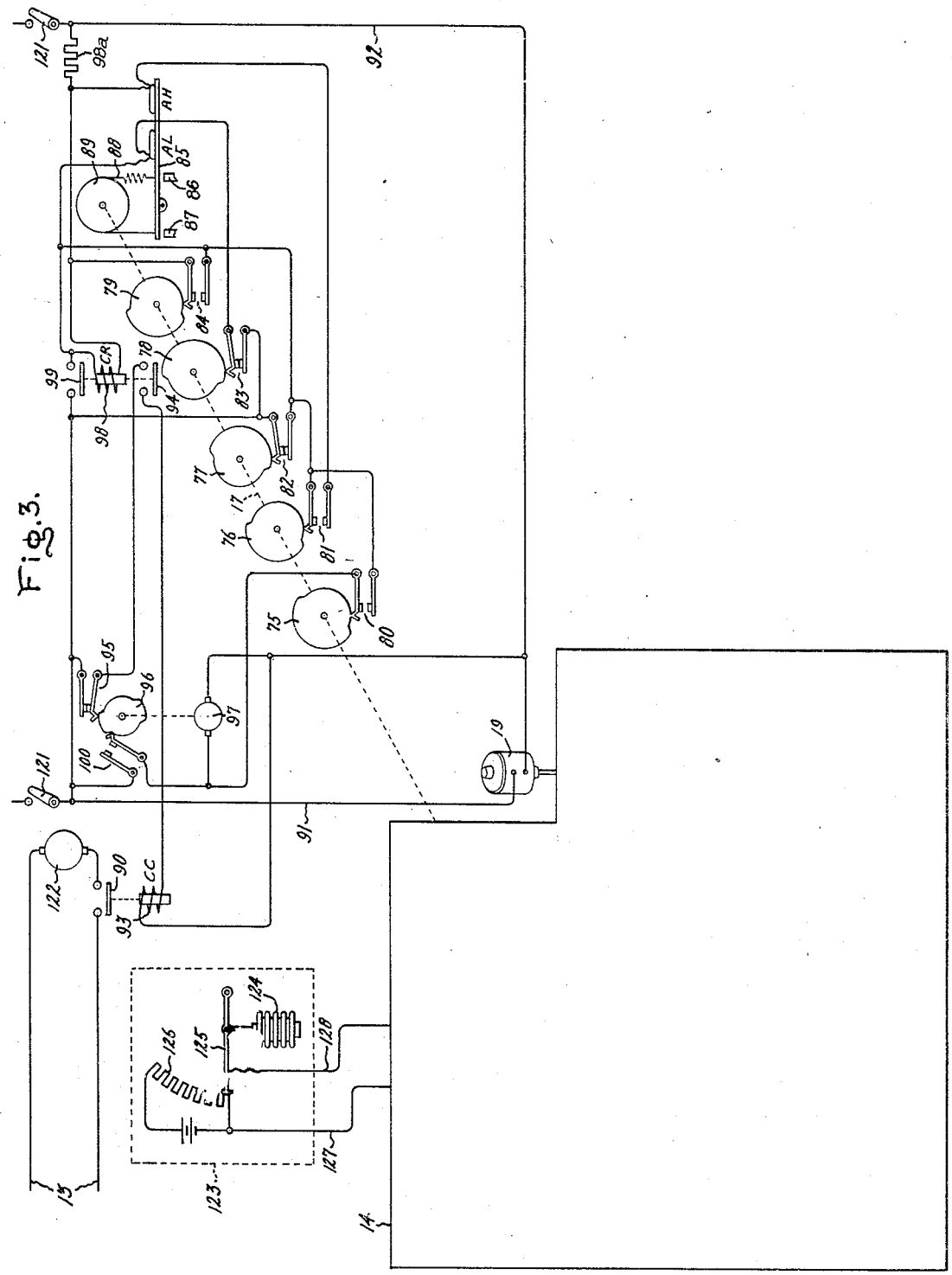

2,387,562

UNITED STATES PATENT OFFICE 2,387,562

CONDITION CONTROL SYSTEM

Albert W. Brunot, Lynn, Mass., assignor to General Electric Company, a corporation of New York Application December 7, 1942, Serial No. 468,165

17 Claims. (Cl. 236—15)

My invention relates generally to condition control systems and has particular application to the control of temperature of enclosures, such as buildings, industrial heating furnaces, and the like. As will be understood from the following specification and claims, however, my invention is not necessarily limited in its broader aspects to the control of temperature, but is adapted to the control of other conditions media.

Various fundamental types of temperature control systems are well known among those skilled in the art. Of these, the "on-off" control is perhaps the simplest but is also the least dependable for the accurate maintenance of a condition within predetermined close limits. By an "on-off" control is meant one in which the output of the condition changing means or the input to the conditioned space is changed substantially instantaneously between any two predetermined limiting values in response to whether the temperature of the space is above or below the desired value. For example, in an oil burning steam heating system the output of the heater is varied almost instantaneously from zero to substantially its maximum value, the time off and time on being directly dependent upon the position of a room thermostat. In the "on-off" type of control it is not strictly necessary that the output be varied from zero to 100 per cent, but it may be varied between any two desired values, the lower of which is insufficient to maintain the desired temperature of the space and the higher of which is more than sufficient to maintain the desired temperature. For example, in an electric heating system the off period is not necessarily one in which the heating resistor is completely disconnected from its source of supply but may be one in which an impedance is inserted in series with the resistor. Such impedance may be a simple resistor or a saturable core reactor.

While the "on-off" type of control is characterized by relatively quick response, it is often found objectionable in heating systems using a large input of energy, such as industrial electric heating furnaces, because of the tendency of the relatively high rate of heat input to cause overshooting of temperature beyond the desired control point. Such overshooting of the control point frequently causes a cyclic variation of temperature of a magnitude greater than that permissible in closely regulated processes. My invention provides means which may be readily and inexpensively applied to an "on-off" control system whereby the temperature fluctuations caused by overshooting of the control point are reduced to an almost imperceptible value, both during the initial rise of temperature from the cold condition of the furnace or other space and during maintenance of the temperature at its normal value.

Accordingly, it is a general object of my invention to provide new and improved means for maintaining the condition of a medium substantially constant at any selected value.

It is a further object of my invention to provide improved means for minimizing overshooting of the value of a condition upon initial increase of the condition to its desired normal value.

It is a still further object of my invention to provide means for controlling the temperature of an enclosure within very close limits.

Another object of my invention is to provide a new and improved control system for an industrial heating furnace which is capable of bringing the furnace from its cold condition to a desired temperature with a minimum of overshooting and of maintaining the selected temperature with only very slight and substantially imperceptible fluctuations.

It is still another object of my invention to provide timing means operable in conjunction with an "on-off" condition control system periodically to change the output of the condition changing means from its maximum to its minimum value thereby to provide an average and intermediate value of output which may be used as one output limit of the "on-off" control to provide regulation of the value of the condition within more exact limits.

It is still a further object of my invention to provide in connection with an "on-off" condition control system tuning means for cyclically changing the output of the condition changing means to provide an average output intermediate the maximum and minimum values in combination with control means for producing "on-off" operation between this average value and one of the limiting values within selected ranges of operation.

In accordance with my invention I superimpose upon a simple "on-off" control system means for periodically changing the output of the condition changing means from its maximum to its minimum value at a predetermined fixed ratio of time off to time on thereby to provide an average output value which is intermediate the normal minimum and maximum values. The ratio of time off to time on during cyclic operation of the condition changing means is such that the average output value is only slightly more than sufficient to maintain the desired value of the condition, such as temperature. I also provide means for so controlling the cyclic operation that it is effective only under certain conditions, whereby in effect a new set of limiting values is selected for "on-off" operation, namely, the average value during cyclic operation and one of the normal limiting output values. Specifically, upon initial increase of the value of the condition toward its desired value I provide means operable when the condition attains a predetermined value substantially less than the desired value to bring into operation a timing means for alternately increasing and decreasing the output of the condition changing means despite the fact that the value of the condition has not yet attained its desired value and the normal condition control means is still calling for the maximum output. In this way the maximum available output is decreased to the average value during cyclic operation, so that the condition approaches its normal value more gradually and without appreciable overshooting. My system is also operable during maintenance of the condition at its normal value to bring into operation the cycling means whenever maximum output of the condition changing means is demanded so long as departures from the normal value are within a predetermined normal range. Thus departures of the condition within the normal range are more gradually compensated due to the fact that in effect the system is operating as an "on-off" system between the relatively close limits of its minimum value and its intermediate value during cyclic operation, rather than between its widely separated normal minimum and maximum values.

For a more complete understanding of my invention and for a further appreciation of its objects and advantages, reference should now be had to the following detailed specification taken in conjunction with the accompanying drawings in which Fig. 1 is a schematic circuit diagram of an electric furnace control system embodying my invention; Fig. 2 is a combined time chart and sequence diagram of switch operation showing various conditions of operation of the system; and Fig. 3 is a schematic circuit diagram similar to that of Fig. 1 showing my invention applied to the "on-off" control of an oil burner motor for a domestic heating system.

Referring now to the drawings and particularly to Fig. 1, I have shown an electric heating furnace 10 comprising an electric heating resistor 11 connected through a current limiting resistor 12 to a source of alternating current supply 13. The resistor 12 is arranged to be shunted and unshunted under the control of a temperature controller and recorder designated generally by the reference numeral 14 to control the input to the furnace. When the resistor is shunted, the per cent furnace output is a maximum or 100 per cent and the furnace is "on." When the resistor 12 is unshunted, the per cent furnace output is a minimum, for example 25 per cent, and the furnace is considered "off."

The general organization of the recorder and controller 14 comprises a galvanometer including a moving coil 15 and a needle 16, a control shaft 17, and a mechanism 18 for translating deflections of the galvanometer into corresponding movements of the control shaft. The needle 16 is movable to either side of a midposition to indicate the extent of departure of the temperature of the furnace 10 from a desired value. A substantially constant speed continuously operating motor 19 is arranged periodically to actuate the mechanism 18 and continuously to move a record sheet 20. The control shaft 17 is actuated by the motor 19 and the mechanism 18, and the position of the shaft is indicative of the actual temperature within the furnace 10. A suitable pen or other indicating device 21 is connected to the control shaft 17 continuously to record on the roll 20 the actual temperature of the furnace.

More specifically, the motor 19 is arranged continuously to rotate through suitable gearing 22 a motor driven shaft 23. The continuously movable record sheet 20 is also driven from the motor 19 by means of suitable gearing 24 and 25 between the motor driven shaft 23 and a record driving roll 26. The control shaft 17 carries at one end a control disk 30. The face of the control disk 30 is periodically engaged by suitable friction clutching elements 31 and 32 mounted upon the ends of a centrally pivoted lever 33. The lever 33 is pivoted on a horizontal axis, as shown in the drawing, at the movable end of a continuously oscillating lever 34. The lever 34 is pivotally mounted upon a suitable base at its upper end and is arranged to lie in continuous following engagement with a cam 35 carried by the motor driven shaft 23. The cam 35 and lever 34 periodically move the clutching members 31 and 32 into and out of clutching engagement with the control disk 30. The lever 33 has connected thereto a short arm 36 carrying a pair of pins 37 and 38, each of which is positioned to be engaged by one of a pair of deflecting levers 39 and 40. The lever 39 is pivotally mounted at 41 and the lever 40 is pivotally mounted at 42 upon the instrument base, the lower ends of the levers 39 and 40 engaging the pins 37 and 38, respectively. The deflecting levers 39 and 40 extend in substantially parallel spaced relation between their pivot points 41 and 42 and the pins 37 and 38. At their upper ends the levers 39 and 40 are provided with short perpendicular arms 43 and 44, respectively, which extend inwardly toward each other and toward the galvanometer needle 16. The inner ends of the arms 43 and 44 are slightly spaced apart to permit free vertical movement of the galvanometer needle 16 when this needle is in its midposition between the arms.

For periodically raising the galvanometer needle 16 and obtaining a controlling movement proportional to the deflection of the needle, I provide a substantially U-shaped rocker arm 50 pivotally mounted at 51 to the instrument base and carrying at its outer end a downwardly extending cam follower arm 52. The arm 52 is positioned in continuous following engagement with a cam 53 mounted upon the motor driven shaft 23 and is periodically raised and lowered as the cam 53 rotates. The U-shaped rocker arm 50 carries upon its upper edge a pair of projections 54 and 55 which lie adjacent the arms 43 and 44, respectively, and are provided with diverging inclined surfaces 56 and 57, respectively. The fundamental organization of the mechanism 18 is completed by a pair of similar restoring cams 58 and 59 mounted upon the motor driven shaft 23 and arranged to engage opposite ends of the tilting lever 33 to restore it to its midposition after it has been displaced by one of the deflecting levers 39 or 40.

The operation of the galvanometer mechanism 18 may be briefly summarized as follows: Assuming first that the galvanometer needle 16 remains in its midposition, as shown in the drawing, the motor driven shaft 23 rotates continuously, thereby periodically to oscillate the lever 34 for moving the clutching portions 31 and 32 of the lever 33 into and out of engagement with the face of the control disk 30 and also periodically to raise the U-shaped rocker arm 50 into engagement with the galvanometer needle 16. However, since the needle 16 is assumed to be in its midposition, raising of the needle has no effect upon the mechanism since the needle is simply pressed upwardly into the space between the short inwardly extending arms 43 and 44.

If now the galvanometer needle 16, which is freely movable between the arms 43 and 44 and the projections 55 and 56 when the arm 50 is lowered, is displaced to one side of its midposition when the rocker arm 50 is next raised, the lower side of the needle will be engaged by the inclined surface 56 or 57 depending upon the side to which the needle is deflected. For example, let it be assumed that the needle 16 is to the left of its midposition when the arm 50 is raised. In this case the inclined surface 56 will engage the galvanometer needle and will raise it into engagement with the arm 43 of the deflecting lever 39 so that the arm 43 and lever 39 will be rotated in a counterclockwise direction as the rocker arm 50 continues its upward movement. Since the surface 56 is inclined and since the limits of movement of the rocker arm 50 are fixed, it will be clear that the extent of the rotation of the lever 39 upon an upward movement of the rocker arm 50 is directly proportional to the degree of deflection of the galvanometer needle 16 from its midposition. When the lever 39 is rotated counterclockwise it engages the pin 37 on the arm 36 and moves the lever 33 counterclockwise through an angle proportional to the displacement of the needle 16 from its midposition. The cams 35, 53, 58 and 59 upon the motor driven shaft 23 are so arranged that during this tilting movement of the lever 33 the clutching members 31 and 32 are out of engagement with the control disk 30 and the lever 33 is not engaged by the restoring cams 58 and 59. Immediately after the rotary displacement of the lever 33 the cam 35 permits the members 31 and 32 to engage the clutching surface of the control disk 30, and shortly after this engagement the restoring cams 58 and 59 are brought into operative relation with the lever 33. In the example assumed the lever 33 has been rotated in a counterclockwise direction, as viewed in the drawings, so that as the cams 58 and 59 are rotated only the cam 59 will engage the lever 33 thereby to rotate the lever 33 and the control disk 30 in a clockwise direction and restore the lever 33 to its normal horizontal position. It will thus be clear that whenever the galvanometer needle 16 is found displaced from its midposition upon raising of the rocker arm 50, the mechanism 18 effects a movement of the control disk 30 in a direction corresponding to the direction of deflection of the lever 16 and by an amount corresponding to the magnitude of the deflection.

In order to obtain from the movement of the control disk 30 an indication of the actual temperature of the furnace, the control shaft 17 is provided with a drum 65 connected to drive a wire 66 which carries the pen 21.

The manner in which the galvanometer needle 16 is deflected in proportion to the deviations of the actual temperature of the furnace 10 from a desired normal value will be clear from a consideration of the potentiometer circuit shown connected to the galvanometer coil 15. This circuit comprises a battery 67 connected continuously to supply current to a slide wire 68 through a variable resistor 69. The resistor 69 provides a manual adjustment by means of which the total voltage drop across the slide wire 68 may be controlled. A variable potentiometer voltage, which is taken off between one end of the slide wire 68 and a movable contact arm 70 connected to the control shaft 17, is balanced against the voltage of a thermocouple 71 located in the furnace 10. The circuit through which these opposing voltages of the thermocouple 71 and the potentiometer 68 are balanced include the coil 15 of the galvanometer, so that when the potentiometer voltage is equal to the voltage of the thermocouple, no current flows and the galvanometer coil 15 assumes its midposition. It will now be clear that the galvanometer 15, 16 and the mechanism 18 function as a follow-up system to maintain the potentiometer voltage at the slider 70 substantially equal and opposite to the voltage of the thermocouple 71 as determined by the temperature of the furnace 10. The final position of the potentiometer slider 70 when the furnace temperature is at its desired value may be selected by manipulation of the control resistor 69. So far as the parts of the apparatus heretofore described are concerned, the position of the slider 70 when the furnace temperature is at the control point is immaterial. However, certain other parts of the apparatus, which are mounted upon the control shaft 17 and will be described hereinafter, require that the control point be displaced by a predetermined number of degrees from the initial position of the shaft 17. It will therefore be assumed for the purpose of illustration that the resistor 69 is so set that the control point is 180 degrees in a clockwise direction from the initial position of the shaft 17.

The control shaft 17 also carries a plurality of cams 75, 76, 77, 78 and 79 arranged to actuate cam switches 80, 81, 82, 83 and 84, respectively. In addition to the switches 80 to 84, inclusive, a pair of accelerating switches AL and AH are actuated by the control shaft 17. The switches AL and AH are mounted upon a pivoted lever 85. When the lever 85 is in the midposition shown in the drawings both switches AL and AH are open. These switches may be of the mercury type and so arranged that if the lever 85 is tilted in the clockwise direction against a stop 86 the switch AH will be closed, while if the lever 85 is tilted in the counterclockwise direction against a stop 87 the switch AL will be closed. By means of a spring tensioned strap 88 the lever 85 is frictionally connected to a drum 89 mounted upon the shaft 17. Whenever the shaft 17 is rotating in one direction or the other, the drag of the drum 89 upon the strap 88 will be sufficient to tilt the lever 85 in a corresponding direction. The function of the switches 80 to 84, AL and AH will be explained hereinafter in connection with the control circuit to be described.

The current limiting resistor 12 which is connected in series with the electric heating resistor 11 is arranged to be shunted by the normally open contact 90 of a control contactor CC. The contactor CC provides an "on-off" control for the furnace 10 in that when the contact 90 is closed to shunt the resistor 12 the current through the heating resistor 11 is a maximum and the furnace is "on," while when the contact 90 is open, the current through the heating resistor 11 is a minimum, for example 25 per cent of the maximum, and the furnace is "off." A control circuit connected between a pair of alternating current supply lines 91 and 92 controls the operation of the control contactor CC to maintain substantially consant the temperature of the furnace 10.

The control contactor CC includes an actuating winding 93 connected between the alternating current supply lines 91 and 92 through the normally open contact 94 of a control relay CR. The energizing circuit for the actuating winding 93 of the control contactor CC also includes a cam switch 95 actuated by a timing cam 96 which is driven by a substantially constant speed motor 97 in a manner which will be more fully described hereinafter. An actuating winding 98 of the control relay CR is arranged to be energized across the alternating current supply lines 91 and 92 through an energizing circuit which may be followed from the line 91 through the cam switch 83, the accelerating switch AL, the winding 98, and a current limiting resistor 98a to the line 92. An alternate energizing circuit for the coil 98 passes through the cam switch 82 in shunt to the switches 83 and AL. A locking-in interlock contact 99 on the relay CR is also connected in parallel circuit relation to the switches 83 and AL to maintain the control relay in its picked-up position. The actuating coil 98 is arranged to be shunted by the cam switch 81 in series with the accelerating switch AH or by the cam switch 84. The energizing circuit for the timing motor 97 may be traced from the alternating current supply line 91 alternatively or concurrently, depending upon the position of the switches, through the cam switches 82 and 80 in series circuit relation or through a cam switch 100 actuated by the timing cam 96, and the motor 97 to the line 92.

With the foregoing understanding of the construction and arrangement of the various parts of the apparatus, the mode of operation of the system as a whole will be clear from the following description. Referring first to Fig. 2, I have shown therein at the lower portion of the figure a graphical representation of furnace temperature plotted against time, and at the upper portion of the figure a diagram representing per cent output of the furnace heater 11 plotted against the same time scale. In these drawings the line 110 represents the desired normal furnace temperature, the line 111 represents a furnace temperature slightly above, for example about five degrees above the desired furnace temperature, and the line 112 represents a furnace temperature only slightly above the line 111. The lines 113 and 114 correspond to the lines 111 and 112 and represent furnace temperatures slightly below, for example about five degrees below the desired temperature 110. Taken together the lines 111, 112 and 113, 114 define a normal range within which the actual furnace temperature may permissibly vary about the desired temperature 110. Since an industrial electric furnace has been shown at 10 by way of example, let it be assumed that the line 110 represents a furnace temperature of 1500 degrees F. At Fig. 2 the line 115 may then represent a furnace temperature substantially below the desired temperature, for example 300 degrees below the desired normal of 1500 degrees. The line 116 represents the actual furnace temperature, shown increasing from the initial cold condition of the furnace toward and slightly beyond the normal temperature 110 and then varying substantially imperceptibly within the normal range defined by the temperatures 112 and 114. Referring now to the upper portion of Fig. 2, it will be clear that the per cent furnace output marked "Minimum" represents the condition where the resistor 12 of Fig. 1 is unshunted and the furnace is "off," while the per cent furnace output marked "Maximum" represents the furnace output with the resistor 12 shunted so that the furnace is "on."

At Fig. 2, I have also shown graphically the control settings of the cams 75 to 79, inclusive, and their respective cam switches 80 to 84, inclusive. From a joint consideration of Figs. 1 and 2, it will be evident that the cam switch 80 is open in the initial position of the mechanism when the furnace is cold, as shown in Fig. 1, and is closed by the cam 75 when the furnace temperature reaches about 300 degrees below the normal desired temperature 110. The mode of operation of the other cam switches will be evident from the drawings. It should be particularly noted that as the furnace temperature increases the cam switch 82 opens slightly before the cam switch 81 closes, while the cam switch 83 opens slightly before the cam switch 84 closes.

Let it now be assumed that the furnace is cold, that the control resistor 69 has been set to maintain a normal temperature of 1500 degrees and that the control point at 1500 degrees is at a position of the shaft 17 which is displaced 180 degrees clockwise with respect to the initial position shown. The operation of the system will be as follows: The apparatus is set in operation by closing a suitable contactor 120 to energize the furnace heating resistor 11 and a suitable control switch 121 to supply power to the alternating current supply conductors 91 and 92. Since the furnace is initially cold, the control shaft 17 is in the position shown. Thus the cam switches 82 and 83 are closed and the cam switches 80, 81, and 84 are open. As soon as the control switch 121 is closed, an energizing circuit is completed through the cam switch 82 for the actuating winding 98 of the control relay CR. Upon actuation of the control relay 98 to close its contacts 94 and 99, a locking-in circuit is completed for the actuating winding 98 through the contacts 99 and an energizing circuit is completed for the actuating winding 93 of the control contactor CC through the contacts 94. This energizing circuit may be traced from the control line 91 through the cam switch 95 of the timer cam 96, the contact 94 of the control relay CR and the actuating winding 93 of the control contactor CC to the line 92. Upon actuation of the control contactor CC the current limiting resistor 12 in the heating circuit is shunted so that maximum energization is applied to the heating resistor 11.

With the furnace 10 connected for maximum output as explained above, let it first be assumed that the control shaft 17 has not yet moved. The switch lever 85 may be against either the stop 86 or the stop 87, depending upon the last direction of movement of the shaft 17. If the last movement of the shaft 17 was counterclockwise with decreasing temperature the switch AL will be closed. The timing cam 96 is initially in the position shown so that the cam switch 95 is closed and the cam switch 100 is open. As the furnace begins to heat up, the voltage of the thermocouple 71 exceeds that of the potentiometer 68, 70 and produces a deflection of the galvanometer needle in the proper direction. With the orientation of the parts as shown this deflection will be to the left and toward the arm 43. By means of the mechanism 18 previously described the deflection of the needle 16 to the left will be translated into a clockwise movement of the control shaft 17 and a corresponding movement of the pen 21 to indicate the actual temperature of the furnace 10. As soon as the control shaft 17 moves in the clockwise direction, the accelerating switch AH will be closed. However, the closing of the switch AH has no immediate effect, since the serially connected cam switch 81 is open. Thus as the furnace heats up and the control shaft 17 is rotated clockwise in accordance with the actual furnace temperature, no significant change is made in the control circuits until the actual temperature 116 of Fig. 2 reaches the point indicated by the line 115 about 300 degrees below the desired normal temperature 110. When this point is reached, the control switch 80 is closed by its actuating cam 75, as indicated at Fig. 1, and by the sequence diagram of Fig. 2.

Upon closure of the cam switch 80 an energizing circuit is completed for the timing motor 97. This energizing circuit may be traced from the control line 91 through the cam switch 82, the cam switch 80, and the motor 97 to the control wire 92. When the motor 97 is set in operation it rotates the timing cam 96 at substantially constant speed. The cam 96 may have any desired configuration, but in the arrangement shown by way of illustration the cam is arranged to rotate one complete revolution per minute and to maintain the cam switch 95 alternately closed for ten seconds and open for twenty seconds. Since the energizing winding 93 of the control contactor CC includes the cam switch 95, the alternate opening and closing of the switch 95 causes alternate energization and deenergization of the control contactor CC thereby periodically to change the output of the heating resistor 11 of the furnace 10 from its maximum to its minimum value. Thus, as indicated at Fig. 2, for furnace temperatures between the line 115 and the line 114 the furnace is alternately on for ten seconds and off for twenty seconds regardless of the value or direction of change of the temperature within this range. The effect of this cyclic operation of the control contactor CC is to provide an intermediate average output of the heating resistor 11 so that after the furnace temperature reaches a point approximately 300 degrees below its desired temperature, the average furnace input is reduced so that it is only slightly greater than that required to maintain the furnace 10 at 1500 degrees F. Accordingly the continued increase of temperature of the furnace takes place at a lower rate.

When the furnace temperature reaches a point very close to the desired normal temperature, for example when it reaches a temperature about five degrees below the normal temperature as represented by the line 114 of Fig. 2, the cam switch 82 is opened and very shortly thereafter the cam switch 81 is closed. The opening of the cam switch 82 disables the original pickup circuit for the actuating winding 98 of the control relay CR, and the closure of the cam switch 81 completes a short circuit about the coil 98. The short circuit around the coil 98 includes the cam switch 81 and the accelerating switch AH, the switch AH being already closed as a result of the preceding clockwise movement of the control shaft 17 with rising temperature. When the coil 98 is short circuited, the control relay CR drops out and, through its contact 94, disables the energizing circuit for the actuating winding 93 of the control contactor CC so that the control contactor remains deenergized regardless of the position of the cam switch 95. When the cam switch 82 is opened, the timer motor 97 will stop immediately if it so happens that the cam switch 100 is open at that time. However, if the cam switch 100 is closed, the motor 97 will run until the switch 100 opens and will then stop in the position shown at Fig. 1. It is to be noted that the cam 96 is so arranged that the cam switch 95 closes immediately before the cam switch 100 opens so that the timer will always begin operation with the switch 95 closed and the switch 100 open. With the output of the heating resistor 11 at its minimum, as indicated at Fig. 2, the furnace temperature continues to rise toward the control point as a result of the heat storage in the resistor and the minimum power supplied to the resistor.

For purposes of illustration it may be assumed that the furnace temperature increases beyond the control point indicated by the line 110 at Fig. 2 and slightly beyond the normal range of operating temperatures defined by the lines 112 and 114. As soon as the temperature of the furnace rises above the normal range, the cam switch 83 opens and immediately thereafter the cam switch 84 closes. Opening of the cam switch 83 produces no immediate result, since this switch is in series circuit relation with the accelerating switch AL and the switch AL is open because the furnace temperature is still rising. Similarly, closure of the cam switch 84 produces no immediate result even though this switch completes a short circuit around the actuating winding 98 of the control relay CR. The control relay CR is already dropped out at this time so that a further short circuit around the winding 98 has no effect. However, since the minimum input to the furnace is now insufficient permanently to maintain a temperature of 1500 degrees F., the furnace temperature will ultimately decrease. As soon as the temperature of the furnace again falls within the normal range defined by the line 112 of Fig. 2, the cam switch 84 is opened and immediately thereafter the cam switch 83 is closed. Opening of the cam switch 84 and the switch AH removes the short circuits from the winding 98 of the control relay CR. Closure of the switch 83 completes an energizing circuit for the actuating winding 98 of the control relay CR. This energizing circuit may be traced from the control wire 91 through the cam switch 83, the accelerating switch AL (now closed because the temperature is decreasing and the control shaft 17 moving counterclockwise), and the winding 98 to the control wire 92. Through the cam switches 83 and AL an energizing circuit is also completed for the timing motor 97. This circuit may be traced from the line 91, through the switches 83 and AL, the cam switch 80, and the motor 97 to the line 92. Thus the control contactor CC is periodically actuated to its closed circuit position under the control of the cam switch 95 and the timing cam 96 in the manner previously explained.

Since the average furnace output during cyclic operation is sufficient to increase the furnace temperature, the control shaft 17 will be again rotated in the clockwise direction and the accelerating switch AL opened and the accelerating switch AH closed. Opening of the accelerating switch AL disables the pickup circuit for the control relay CR, and closure of the accelerating switch AH completes a short circuit around the actuating winding 98 of the control relay CR through the cam switch 81 and the accelerating switch AH, thereby to disable the control relay CR and to drop out the control contactor CC. The furnace will now supply its minimum output and the timer motor 97 will be stopped by its limit switch 100.

In the event that the load on the furnace has been increased, so that the average furnace input under cyclic operation is insufficient to prevent a further decrease of furnace temperature, the temperature may fall below the lower limit of the normal range defined by the lines 112 and 114. If this happens, the cam switch 81 will be opened and immediately thereafter the cam switch 82 will be closed. Opening of the cam switch 81 prevents any short circuiting of the actuating winding 98 of the control contactor CR through the accelerating switch AH, since the switches 81 and AH are in series circuit relation across the winding. Furthermore, closure of the cam switch 82 maintains the control relay CR picked up regardless of the position of the accelerating switch AL, since the cam switch 82 is in shunt with the series circuit including the cam switch 83 and accelerating switch AL. Thus when the furnace temperature is at any point between the lower limit of the normal range of operation and a point about 300 degrees below the control point, as indicated by the line 115 of Fig. 2, cyclic operation of the control contactor CC continues regardless of whether the furnace temperature is rising or falling, thereby continuously to supply the intermediate per cent output of the furnace.

By way of summary it may now be noted that by superimposing my timed cyclic operation upon an "on-off" control system within certain ranges of operation, I have provided a system subject to substantially less overshooting. When the furnace temperature is more than 300 degrees below the control point the furnace output is a maximum and substantially greater than necessary to maintain the temperature of the control point. To avoid appreciable overshooting of the control point my timing means reduces the furnace output by cyclic operation when the temperature comes within 300 degrees of the control point. Within the 300 degree range the furnace output is cyclic whether the furnace temperature is increasing or decreasing and is only slightly greater than necessary to maintain the temperature of the control point. This cyclic operation produces not only a slower but also a more even increase of temperature, for the heat put in during the 100 per cent portion of the cycle may pass from the heating resistor to the heated object during the 25 per cent portion of the cycle. Furthermore, when the temperature is within a normal range in the immediate region of the control point the system operates as an "on-off" system between the minimum furnace output and the average value during cyclic operation as a new maximum, the output being a minimum when furnace temperature is increasing within the normal range and being cyclic when the furnace temperature is decreasing within the range. Since these limiting values of output are closer together than the normal maximum and minimum, the temperature is subject to less violent fluctuation. Finally, when the temperature is above the normal range the furnace output is always a minimum whether the temperature is increasing or decreasing.

Referring now to Fig. 3, I have shown my invention applied to the control of an oil burner motor 122 of the type commonly used in connection with domestic heating systems. The burner motor 122 will be understood to form part of a heating system which supplies heat to a conditioned space 123. For the purpose of indicating the temperature of the conditioned space 123, I have shown a thermostatic bellows 124 arranged to actuate a sliding contact 125 forming part of a potentiometer 126. It will be understood that the voltage supplied from the potentiometer 126 to the wires 127 and 128 corresponds in all respects to the voltage supplied by the thermocouple 71 of Fig. 1, and is utilized to oppose the voltage of the follow-up potentiometer 68, 70 forming part of the controller and recorder mechanism 14. In all other respects the system of Fig. 3 is identical with that of Fig. 1 and similar parts have been assigned like reference numerals. At Fig. 3 the controller and recorder 14 has been shown only in block form. It is believed that the mode of operation of the system of Fig. 3 will be entirely clear from the foregoing description of the operation of the system of Fig. 1.

Although I have illustrated my invention only as applied to the control of space heating systems, I wish to have it understood that in its broader aspects the invention may be applied to other condition control systems, such as, for example, cooling systems, humidifying systems, fluid pressure systems, and the like. Furthermore, while I have shown and described only certain preferred embodiments of my invention by way of illustration, many variations and modifications will undoubtedly occur to those skilled in the art. It will therefore be understood that I intend in the appended claims to cover all such modifications as fall within the true spirit and scope of my invention.

What I claim as new and desire to secure by Letters Patent of the United States is:

1. In a condition control system, condition changing means, means responsive to said condition for substantially instantaneously changing the output of said condition changing means between predetermined maximum and minimum values to maintain a predetermined normal value of said condition, timing means for periodically interrupting maximum output operation of said condition changing means at a predetermined fixed ratio of time-on to time-off thereby to reduce the maximum available output to less than said maximum output, and control means actuable in accordance with the value of said condition to energize said timing means above a selected value of said condition less than said normal value and to deenergize said timing means below said selected value.

2. In a condition control system, condition changing means, means responsive to said condition for substantially instantaneously changing the output of said condition changing means between predetermined maximum and minimum values to maintain a predetermined normal value of said condition, timing means for periodically interrupting maximum output operation of said condition changing means at a predetermined fixed ratio of time-on to time-off thereby to reduce the maximum available output to less than said maximum output, and means controlled by said condition responsive means for energizing said timing means only within predetermined selected ranges of the value of said condition contiguous said normal value.

3. In a condition control system, condition changing means, means for controlling the output of said condition changing means comprising a control member movable substantially instantaneously between maximum and minimum output positions, and means responsive to said condition for controlling said member to maintain a normal value of said condition comprising means responsive to an increase in said condition within a normal range above and below said normal value to maintain said control member in said minimum output position, and means responsive to a decrease in said condition within said range periodically to move said control member between said positions at a predetermined fixed ratio of time-on to time-off.

4. In a condition control system, condition changing means, output control means arranged substantially instantaneously to change the output of said condition changing means between predetermined maximum and minimum values, means responsive to said condition for controlling said output control means to maintain said condition within a predetermined normal range, timing means operable in conjunction with said output control means periodically to interrupt maximum output operation of said condition changing means at a predetermined fixed ratio of time-on to time-off thereby to reduce the maximum available output to an average value less than said maximum value, means operable as said condition approaches said normal range upon increase from an initial value to initiate operation of said timing means thereby to prevent overshooting of said condition, and means operable upon decrease of said condition within said normal range to initiate operation of said timing means thereby to limit "on-off" operation of said condition changing means within said normal range to said average value and to said minimum value.

5. In a condition control system, condition changing means, output control means for said condition changing means having maximum and minimum output positions, means for maintaining a normal value of said condition comprising means responsve to departure of said condition beyond a predetermined normal range of values for actuating said output control means continuously to increase or continuously to decrease the value of said condition in accordance with the direction of the departure, means responsive to an increase in said condition within said normal range for actuating said output control means to said minimum output position, and means responsive to a decrease of said condition within said normal range for periodically actuating said output control means between said maximum and minimum output positions at a predetermined fixed ratio of time-on to time-off thereby gradually to increase the value of said condition.

6. A temperature control system comprising electric heating means, variable impedance means connected in circuit with said heating means, temperature responsive means for controlling said impedance means substantially instantaneously to change the output of said heating means between predetermined maximum and minimum values thereby to maintain said temperature substantially constant at a desired value, timing means for periodically interrupting maximum output operation of said heating means at a predetermined fixed ratio of time-on to time-off, and control means actuable in accordance with said temperature for energizing said timing means within a predetermined limited range of temperatures immediately below said desired value thereby to limit the maximum available output of said heating means to an average value less than said maximum value.

7. A temperature control system comprising electric heating means, variable impedance means connected in circuit with said heating means, temperature responsive means for controlling said impedance means substantially instantaneously to change the output of said heating means between predetermined maximum and minimum values thereby to maintain said temperature within a predetermined normal range of temperature, timing means for periodically interrupting maximum output operation of said heating means at a predetermined fixed ratio of time-on to time-off thereby to limit the maximum available output of said heating means to an average value less than said maximum value, and control means responsive to a decrease of temperture within said normal range for energizing said timing means.

8. A temperature control system comprising electric heating means, variable impedance means connected in circuit with said heating means, temperature responsive means for controlling said impedance means to maintain said temperature within a predetermined normal range comprising means responsive to an increase in temperature within said range to establish a maximum value of said impedance thereby to minimize the output of said heating means, and means responsive to a decrease of temperature within said range to initiate cyclic variation of said impedance at a predetermined fixed ratio of time-on to time-off thereby to limit the maximum available output of said heating means to an average value less than its maximum value.

9. A temperature control system comprising electric heating means for supplying heat to a conditioned space, variable impedance means in circuit with said heating means, control means positionable in accordance with the temperature of said space, means actuable by said control means to vary the impedance of said impedance means between predetermined maximum and minimum values, timing means for periodically changing the impedance of said impedance means between said values at a predetermined fixed ratio of time-on to time-off, and means operable in accordance with the position of said control means for energizing said timing means only above a selected value of temperature less than a desired value.

10. A temperature control system comprising electric heating means for supplying heat to a conditioned space, variable impedance means in circuit with said electric heating means, control means positionable in accordance with the temperature of said space, means actuable by said control means to vary the impedance of said impedance means substantially instantaneously between predetermined maximum and minimum values, timing means for periodically changing the impedance of said impedance means between said values at a predetermined fixed ratio of time-on to time-off, and means operable in accordance with the position of said control means for initiating operation of said timing means to limit the maximum available output of said heating means within predetermined selected temperature ranges.

11. A temperature control system comprising electric heating means for supplying heat to a conditioned space, variable impedance means in circuit with said electric heating means, control means positionable in accordance with the temperature of said space, means actuable by said control means to vary the impedance of said impedance means substantially instantaneously between predetermined maximum and minimum values, timing means for periodically changing the impedance of said impedance means between said values at a predetermined fixed ratio of time-on to time-off, means controlled by said control means for initiating operation of said timing means to limit the maximum available output of said heating means when the temperature of said space is below a predetermined normal range of temperatures, and means controlled by said control means to initiate operation of said timing means upon a decrease of temperature and to disable said timing means upon an increase of temperature when the temperature of said space is within said normal range.

12. A temperature control system for an electric furnace comprising an electric heating resistor for said furnace, a variable impedance means connected in series circuit relation with said elctric heating resistor, control means positionable in accordance with the temperture of said furnace, electroresponsive means for changing the impedance of said impedance means substantially instantaneously between predetermined maximum and minimum values, switching means actuable by said control means for controlling the energization of said electroresponsive means, timing means for periodically interrupting the energization of said electroresponsive means at a predetermined fixed ratio of time-on to time-off thereby periodically to vary the output of said heating resistor, and means actuable by said control means to energize said timing means only in predetermined temperature ranges of furnace operation.

13. A temperature control system for an electric furnace comprising an electric heating resistor for said furnace, variable impedance means connected in series circuit relation with said electric heating resistor, control means positionable in accordance with the temperature of said furnace, electroresponsive means for changing the impedance of said impedance means substantially instantaneously between predetermined maximum and minimum values thereby to change the output of said furnace between predetermined minimum and maximum values respectively, switching means actuable by said control means for controlling the energization of said electroresponsive means to maintain the temperature of said furnace within a predetermined normal temperature range, timing means operable in conjunction with said switching means periodically to interrupt the energization of said electroresponsive means at a predetermined fixed ratio of time-on to time-off thereby cyclically to change the output of said furnace, and second switching means actuable by said control means to control the energization of said timing means.

14. A temperature control system for an electric furnace comprising an electric heating resistor for said furnace, variable impedance means connected in series circuit relation with said electric heating resistor, control means positionable in accordance with the temperature of said furnace, electroresponsive means for changing the impedance of said impedance means substantially instantaneously between predetermined maximum and minimum values thereby to change the output of said furnace between predetermined minimum and maximum values respectively, switching means actuable by said control means for controlling the energization of said electroresponsive means to maintain the temperature of said furnace within a predetermined normal temperature range, timing means operable in conjunction with said switching means periodically to interrupt the energization of said electroresponsive means at a predetermined fixed ratio of time-on to time-off thereby to reduce the output of said furnace to an average value less than said maximum value, and second switching means actuable by said control means to energize said timing means within a predetermined range of temperatures below said normal range thereby to minimize overshooting of the temperature of said furnace upon increase of said temperature from an initial low value.

15. A temperature control system for an electric furnace comprising an electric heating resistor for said furnace, variable impedance means connected in series circuit relation with said electric heating resistor, control means positionable in accordance with the temperature of said furnace, electroresponsive means for changing the impedance of said impedance means substantially instantaneously between predetermined maximum and minimum values thereby to change the output of said furnace between predetermined minimum and maximum values respectively, switching means actuable by said control means for controlling the energization of said electroresponsive means to maintain the temperature of said furnace within a predetermined normal temperature range, timing means operable in conjunction with said switching means periodically to interrupt the energization of said electroresponsive means at a predetermined fixed ratio of time-on to time-off thereby to reduce the output of said furnace to an average value less than said maximum value, and second switching means actuable by said control means to energize said timing means within a predetermined range of temperatures below said normal range and within said normal range in response to a decrease of furnace temperature.

16. A temperature control system for an electric furnace comprising an electric heating resistor for said furnace, variable impedance means connected in series circuit relation with said electric heating resistor, control means positionable in accordance with the temperature of said furnace, electroresponsive means for changing the impedance of said impedance means substantially instantaneously between predetermined maximum and minimum values thereby to change the output of said furnace between predetermined minimum and maximum values respectively, switching means actuable by said control means for controlling the energization of said electroresponsive means to maintain the temperature of said furnace within a predetermined normal temperature range, timing means operable in conjunction with said switching means periodically to interrupt the energization of said electroresponsive means at a predetermined fixed ratio of time-on to time-off thereby to reduce the output of said furnace to an average value less than said maximum value, and second switching means actuable by said control means to energize said timing means within a predetermined range of temperatures below said normal range regardless of the direction or rate of change of temperature and within said normal range only upon a decrease of furnace temperature, said switching means disabling said timing means upon decrease of temperature within said normal range.

17. A temperature control system for an electric furnace comprising an electric heating resistor for said furnace, variable impedance means connected in series circuit relation with said electric heating resistor, control means positionable in accordance with the temperature of said furnace, electroresponsive means for changing the impedance of said impedance means substantially instantaneously between predetermined maximum and minimum values thereby to change the output of said furnace between predetermined minimum and maximum values respectively, switching means actuable by said control means for controlling the energization of said electroresponsive means to maintain the temperature of said furnace within a predetermined normal temperature range, timing means operable in conjunction with said switching means periodically to interrupt the energization of said electroresponsive means at a predetermined fixed ratio of time-on to time-off thereby to reduce the output of said furnace to an average value less than said maximum value, and second switching means actuable by said control means to energize said timing means within a predetermined subnormal range of temperatures regardless of the direction or rate of change of temperature and within said normal range only upon a decrease of furnace temperature, said switching means disabling said timing means upon an increase of furnace temperature beyond said normal range and in response to increasing furnace temperature within said normal range, whereby at low temperatures below said subnormal range of temperatures the output of said furnace is a maximum and at high temperatures above said normal temperature range the output of said furnace is a minimum while within said subnormal range said timing means is always effective to reduce the output of said furnace by cyclic operation and within said normal temperature range said timing means is effective only in response to decreases of furnace temperature.

ALBERT W. BRUNOT.